3,419,860
VIDEO PHASE COMPARISON GUIDANCE
SYSTEM FOR AIRCRAFT AND THE LIKE
Carl A. Helber, Dayton, Ohio, and Claude J. Pasquier,
Long Island City, N.Y., assignors to Goodyear Aerospace Corporation, a corporation of Delaware
Filed Mar. 14, 1957, Ser. No. 646,041
7 Claims. (Cl. 343—7)

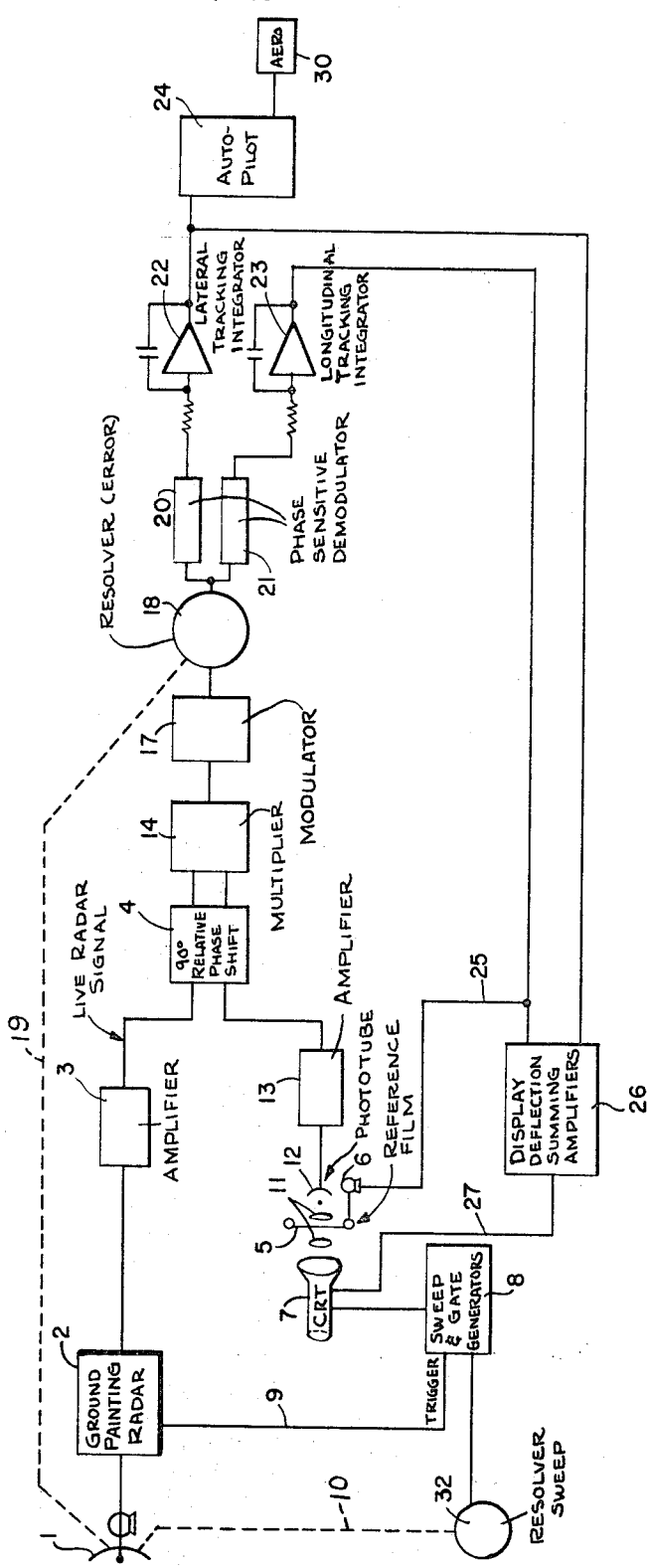

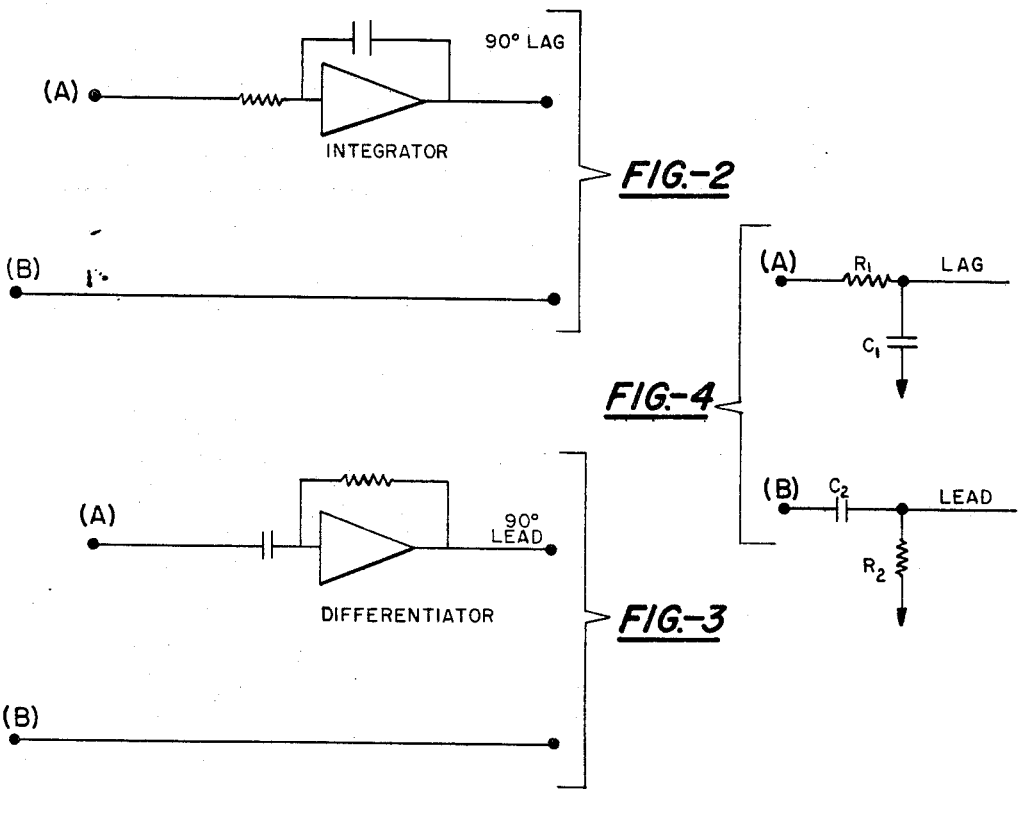
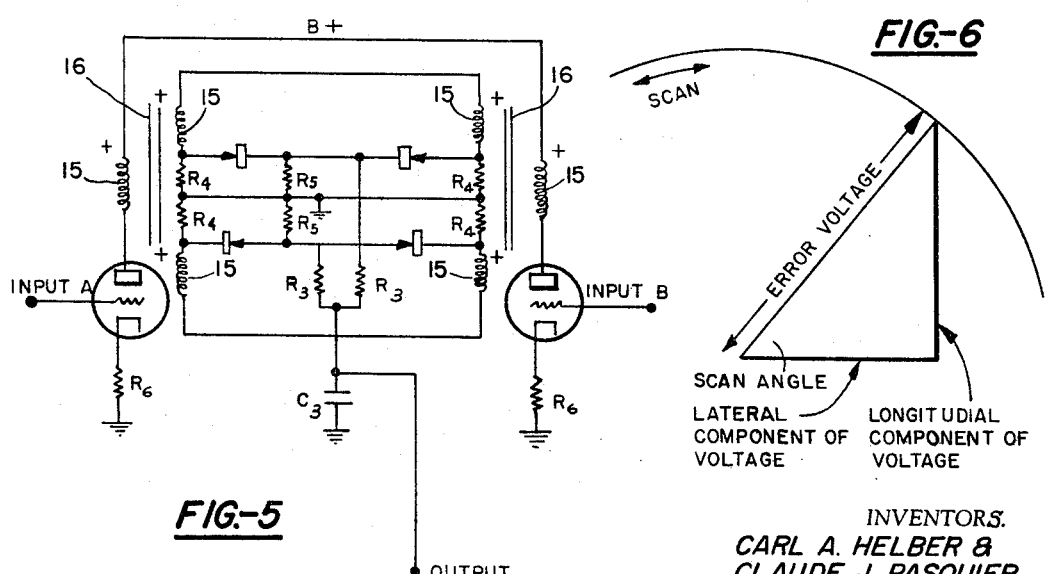

This invention relates to guidance systems for aircraft, and the like, and, more particularly, is concerned with a phase comparison between stored and live video signals which can be resolved into fore-aft and right-left error voltages which can be employed in turn to correct the guidance path of the aircraft.

Heretofore, apparatus has been provided for optically matching a radar image of the terrain over which an aircraft is flying with a previously prepared radar map of the terrain over which the aircraft is intended to fly, error signals being produced in the matching process to return the aircraft to the desired course, (J. B. Jones application Ser. No. 790,151, filed Dec. 6, 1947, now U.S. Patent No. 3,155,969). Apparatus has also been built for electrically comparing a radar image with a previously prepared radar map to again produce error voltages to return the aircraft to the proper course (R. L. Burtner application Ser. No. 76,152, filed Feb. 12, 1949, now U.S. Patent No. 3,178,707).

However, in both the optical and the electrical matching apparatuses described, it has been necessary to effect nutation i.e., scanning movement between the map and the image, in order to determine the amount and direction of mismatch between the actual and the intended flight paths of the aircraft, and to generate error voltages used for correcting the flight path of the aircraft. The mechanism for effecting nutation as described, is not simple, can be electrically noisy and subject to error, and adds to the weight and cost of a guidance system.

It is the general object of the present invention to provide an improved guidance system for aircraft, and the like, wherein no nutation mechanism is utilized, and characterized by a phase comparison of live and stored video information, and wherein phase differences constitute differences in range which can be resolved into lateral and longitudinal error voltages which can be used to return the aircraft to the desired guided path.

Another object of the invention is the provision of a guidance system for aircraft wherein the stored video information may take the form of a radar strip map, or a series of radar maps, or which may be stored on a magnetic tape.

Another object of the invention is the provision of a guidance system of the character described wherein equal frequency components of the live and the stored video information are separated 90° in phase, and the two phase shifted signals are multiplied together resulting in error voltages only when the aircraft is off course, and wherein the error voltages are resolved into fore-aft and right-left error voltages in accord with the position of the scanning antenna producing the live video signals.

Another object of the invention is to provide a guidance system which can be utilized not only with aircraft but which can be employed as well with surface vessels and lower frequency waves for guidance into harbors, or along other charted courses.

The foregoing objects of the invention, and other objects which will become apparent as the description proceeds, are achieved by the provision of a guidance system including means for producing a live video signal of the terrain over which the craft is actually moving, means for producing a stored video signal of the terrain over which the craft should be moving, means for effecting a relative phase shift of 90° between equal frequency components of the live video signal and the stored video signal, means for multiplying the phase shifted live and stored video signals to produce an error voltage when the live video signal drifts away from the stored video signal, and means for resolving the error voltage into right-left and fore-aft components. Normally the craft being guided includes an auto pilot, the means for producing the live video signal is a scanning radar, the means for producing the error voltage is connected to the scanning radar to effect the resolving action, the right-left error voltage is passed to the auto pilot to correct the right-left course of the craft, and the fore-aft error voltage is supplied to the means for producing the stored video signal to change the effective fore-aft speed thereof or to change reference frames in sequential fashion.

For a better understanding of the invention, reference should be had to the accompanying drawings wherein FIG. 1 is a schematic box diagram of a typical apparatus incorporating the principles of the invention;

FIGURES 2, 3 and 4 are diagrammatic electric circuits, in one of the boxes of FIG. 1, for effecting a 90° relative phase shift between equal frequency components of the live and the stored signals;

FIG. 5 is a typical multiplier circuit contained in the multiplier box of FIG. 1; and FIG. 6 is a diagramamtic showing of the manner of resolving an error voltage into its longitudinal and lateral components.

Referring to the drawings, means are provided for producing a live video signal, and such means normally takes the form of a scanning radar antenna 1 including motor means for achieving the scanning movement. In conventional manner, radar pulses are fed to the antenna 1 by a ground painting radar 2 which likewise functions to receive return signals or reflections from various targets on the ground to supply live video or radar signals, hereinafter called A, to an amplifier 3 which passes these signals to a box 4 for effecting a 90° relative phase shift between equal frequency components.

Simultaneously, the apparatus of FIG. 1 is adapted to provide a stored video signal, hereinafter called B, to the 90° phase shift box 4. This stored video signal, it will be understood, is previously prepared of the terrain over which the aircraft is intended to fly, and in one form of the invention, the stored video signal may be on magnetic tape. However, in the embodiment of the invention illustrated in FIG. 1, a radar map 5 of the intended flight path of the aircraft is provided, and a motor 6 is utilized to continuously or periodically advance the film 5 at a speed to keep the terrain shown on the map 5 substantially that viewed by the radar antenna 1.

A cathode ray tube 7 effects a flying spot scanning of the reference map 5 in exact synchronism with the ground scanning by the antenna 1 and radar 2, all in known fashion, this being achieved by conventional sweep and gate generators 8, triggered by connection 9 from radar 2, and coordinated in scan through resolver sweep 32 by mechanical connection 10 from antenna 1. Usually, the tube 7 is that normally employed with the radar 2, but instead of modulating the electron beam with the reflected radar pulses, the beam is maintained as a bright spot on the tube face. Thus, with the aircraft on course, the tube 7 will be scanning on map 5 with its bright spot exactly the same target which is being illuminated on the ground by the antenna 1 and the signal from radar 2.

Inasmuch as the target on map 5 is substantially transparent, the scanning spot from tube 7 can be diretced by means of an optical system 11 to a photocell pickup 12 to produce a stored video signal B which passes through an amplifier 13, and is supplied to the 90° relative phase shift box 4.

As aforesaid, with the aircraft in the correct guided position, that is match position, the signal A from the target on the ground, and the signal B from the same target on map 5 are supplied at the same instance to the box 4, and, at any instant, are of substantially the same frequency and amplitude. Now if equal frequency components of signals A and B are shifted 90° in phase in relation to each other, and if these signals are caused to interact with each other by multiplying, the average error voltage is zero.

If, on the other hand, signals A and B are in box 4 shifted 90° in phase relative to equal frequency components of each other in the manner proposed, and if the aircraft has drifted off course, then signal A will be found to have shifted in phase relative to signal B greater or less than the 90° shift effected in box 4, and multiplying the relatively phase shifted signals together results in an average error voltage which can be resolved into right-left and fore-aft error components in accord with the position of the scanning antenna 1, all as hereinafter more particularly described.

Of course, the composite video signals A and B are made up of many frequencies and the 90° phase shift effected is between equal or substantially equal frequency components of each signal.

A diagrammatic representation of what happens in the phase shifting followed by multiplication is difficult, and the process can be best explained having reference to a mathematical description. Specifically, the flying spot scanner output (when the antenna is stationary) can be written as a Fourier series (1) $E_p(t) = a_0 + a_1 \sin(wt + \varphi_1) + a_2 \sin(2wt + \varphi_2) + \ldots a_n \sin(nwt + \varphi_n)$ where $w$ is the pulse repetition frequency and $\varphi_1, \varphi_2, \ldots \varphi_n$ are phase angles which are a function of the terrain.

likewise the output of the radar can be written as (2)

$$E_r(t) = b_0 + b_1 \sin\left[w\left(t + \frac{2\Delta R}{c}\right) + \varphi_1\right] + b_2 \sin\left[2w\left(t + \frac{2\Delta R}{c}\right) + 2\varphi\right] + \ldots b_n \sin\left[nw\left(t + \frac{2\Delta R}{c}\right) + \varphi n\right]$$

where $\Delta R$ is a small radial displacement of the radar from the point at which the reference map was taken and $c$ is the velocity of light. If the constant components $a_0$ and $b_0$ are removed and all like frequency components in (1) are shifted 90° from those of (2), then the product of (1) and (2) will have a DC component given by $$E_{DC} = \frac{a_1 b_1}{2} \sin\left(\frac{2w\Delta R}{c}\right) + \frac{a_2 b_2}{2} \sin\left(\frac{4w\Delta R}{c}\right) + \ldots \frac{a_n b_n}{2} \sin\left(\frac{2nw\Delta R}{c}\right)$$

This DC error signal, which is the output of the multiplier, has directional sense and becomes zero when $\Delta R$ is zero. The quantity $\Delta R$ goes to zero when the system is at the match point.

Returning to the circuitry which can be utilized in the box 4, although it is not believed possible to devise a passive network which will cover a wide band of frequencies and shift all componets 90° without affecting the relative amplitudes, it is possible to devise a pair of networks which will operate on an input signal so that each frequency component in the output of one network will be shifted 90° in phase from each corresponding component in the output of the other network. See, for example, "Wide Band Phase Shift Networks," by R. B. Dome in December 1946 "Electronics." More specifically, it is possible to effect a 90° lag in signal A by simple integrator circuit shown in FIG. 2. It is also possible to effect a 90° lead in signal A by utilizing a differentiator circuit, as shown in FIG. 3. However, in practical operation, it has been found that the circiut of FIG. 4 utilizing resistances and condensers connected as shown, results in a phase lag in circuit A, and a phase lead in circuit B. The products $R_1$, $C_1$ and $R_2$, $C_2$ are made equal thereby producing a 90° relative phase shift between equal frequency components of the two signals. The circuits are designed to favor an optimum band of video frequencies.

From the 90° relative phase shift box 4, the phase shifted signals pass to box 14 where they are multiplied together. A typical multiplier circuit is illustrated in FIG. 5 wherein the transformer 16 has all of the coils 15 wound on a common core, and with instantaneous voltage polarities being shown by the plus signs. The various other elements of the circiut of FIG. 5 including resistances $R_3$, $R_4$, $R_5$, and $R_6$ and condenser $C_3$ are illustrated by conventional symbols and will be understood.

The quarter square multiplier of FIG. 5 operates as follows:

Output $= (A + B)^2 - (A - B)^2$
Output $= 4AB$.

The subtraction and addition of the two signals A and B is accomplished by the manner of connection of the individual transformer coils. The squaring of the terms is effected by the nonlinear action of the rectifiers. The filter formed by the two resistors and the condenser on the output separates the required DC term from the residual AC terms present at the output.

The error signal produced at the output of the multiplier 14 is passed to the modulator 17, of conventional 400 cycle carrier form and to an AC resolver 18. Modulation of the composite DC error signal is effected in order to resolve the resulting signal in an AC resolver as a function of the antenna scan angle. Resolving the error voltage into its right-left and fore-aft components is necessary inasmuch as the error voltage itself, before resolving, is an indication, plus or minus, of any difference in range between the live video signal A and the stored video signal B. In other words, and as shown in FIG. 6, the range at any instant is at the angle of the sweep of antenna 1, the range forming the hypotenuse of a triangle whose sides join at a right angle, one side constituting the longitudinal vector and the other side the lateral vector of the hypotenuse representing the range. Thus, multiplying the range error by the sine of the angle gives the longitudinal error, and multiplying the range error by the cosine of the angle gives the lateral error.

Angle information is fed to the resolver 18 by the antenna 1 by a connection 19, and this angle information is utilized in known sine and cosine circuitry in box 18 to supply a lateral error signal to a phase sensitive demodulator 20, and to supply a longitudinal error signal to a phase sensitive demodulator 21. The demodulators 20 and 21 operate at 400 cycle reference frequency to provide two orthogonal DC error signals corresponding to lateral and longitudinal displacement from true match of the live and the stored video signals A and B. The phase sensitive demodulators 20 and 21 involve only known circuitry and do not need to be detailed here.

The DC error signals leaving the demodulators 20 and 21 are fed to conventional integrators 22 and 23 and into an autopilot 24, for example. It will be understood that the guidance system of the present invention is normally employed in conjunction with an autopilot, and with the lateral error voltage, plus or minus, being fed to the rudder and aileron controls of the autopilot to correct these controls in a direction to bring the aircraft 30 back on course and to thereby reduce the lateral error voltage to zero. The longitudinal error voltage fed to the autopilot 24, positive or negative, can be utilized to increase or decrease the speed of the aircraft to reduce the longitudinal error voltage to zero.

Usually instead of changing the speed of the aircraft with the longitudinal error voltage, this is fed back by connection 25 to slow down or speed up the operation of the motor 6 moving the film strip 5. Or, if the film strip 5 takes the form of a plurality of separate frames of overlapping areas of the terrain underneath the flight path which the aircraft is intended to fly, the longitudinal error voltage can be employed to trigger the time at which a new frame of the map 5 is snaped into place, and the old frame is moved away.

It will be understood that the error voltages fed to the autopilot 24 and to the map 5 provide, in effect, an external loop for bringing the aircraft back on course, to again bring the live video signal A into match relation with the stored video signal B. An important feature of the invention as disclosed is to likewise provide an internal loop closure in the system for restoring match condition between signals A and B, and this is achieved by feeding the error voltages to display deflection summing amplifiers 26 which are in turn connected by lead 27 to the cathode ray tube 7 to bias or move the scanning spot generated by the tube in a lateral and longitudinal direction to achieve match, all without interfering with its scanning movement. The amplifier 26 utilizes the lateral and longitudinal error voltages as biases on the tube 7 to achieve the function described. The use of the internally closed loop as described improves the over-all operation of the guidance system by reducing errors due to variation in gain, and the like, in the system, and in effect assists the external loop in bringing the aircraft properly back on course.

From the foregoing description, it is believed that the operation of the apparatus will be understood. Suffice it to say here that in the guided flight of an aircraft, the stored video information in the form of a radar map of the terrain over which the aircraft is intended to fly is scanned by the CRT tube 7 in exact triggered sequence with the scanning, by the radar antenna 1 and radar, of the ground over which the airplane is actually flying. If the aircraft is on course, the output of the photo tube 12 and amplifier 13 gives a stored video signal B indicating the reflection of a particular target which signal B is of substantially identical amplitude, frequency and time with the live video signal A coming from amplifier 3 of the same particular target. Then changing the phase of equal frequency components of these signals by 90° in box 4 and multiplying them in box 14 results zero error voltage.

However, if the aircraft moves off course, the live video signal A of a particular target changes its time, i.e., phase relation with the stored video signal B of the same particular target, and the phase shifting of these signals by box 4, followed by multiplying them together in box 14 results in an error voltage. This error voltage is modulated at 17, is resolved into lateral and longitudinal components at 18, is demodulated at 20 and 21, the separate error voltages are integrated at 22 and 23, and with these error voltages then being utilized to bring the aircraft back on course. The respective longitudinal and lateral components of the error voltage are determined, as previously described, by the scanning angle of the radar antenna 1 as transmitted by connection 19 to the resolver 18, and the direction of the error is indicated, of course, by the voltage being positive or negative. The error voltages bring the aircraft back on course, both by the external loop provided by the autopilot for correcting the guidance or speed of the aircraft, or the speed of the reference map, and by the internal loop for deflecting laterally or longitudinally the scan of the cathode ray tube on the map 5.

While the invention is primarily concerned with the guidance of aircraft, including missiles, it will be recognized that the principles thereof can be utilized with lower frequency waves, such as sound waves, for the guidance of ships into harbors or along a selected course in which case the sound waves are utilized to provide a live signal of the bottom over which the ship is passing and to compare this live signal with a stored signal of the bottom over which the ship is intended to pass.

While a certain representative embodiment and details have been shown for the purpose of illustrating the invention, it will be apparent to those skilled in this art that various changes and modifications may be made therein without departing from the spirit or scope of the invention.

What is claimed is:

1. A guidance system for aircraft and the like including an autopilot, scanning radar means for producing a live video signal of the terrain over which the craft is actually moving, means for producing a stored video signal of the terrain over which the craft should be moving, means for effecting a relative phase shift of 90° between equal frequency components of the live video signal and the stored video signal, means for multiplying the phase shifted live and stored video signals to produce an error voltage when the live video signal drifts away from the stored video signal, means connected to the scanning radar means and the error voltage for resolving the error voltage into right-left and fore-aft components, means for supplying the right-left components to the autopilot to correct the right-left course of the aircraft, and means for supplying the fore-aft components to the means for producing the stored video signal to change the effective fore-aft speed thereof.

2. A guidance system for aircraft and the like including scanning radar means for producing a live video signal of the terrain over which the craft is actually moving, means for producing a stored video signal of the terrain over which the craft should be moving, means for effecting a relative phase shift of 90° between the live video signal and the stored video signal, means for multiplying the phase shifted live and stored video signals to produce an error voltage when the live video signal drifts away from the stored video signal, and means connected to the scanning radar means and the error voltage for resolving the error voltage into right-left and fore-aft components which can be used for correcting the guidance of the craft.

3. A guidance system for aircraft and the like including means for producing a live video signal of the terrain over which the aircraft is flying, means for producing a stored video signal of the terrain over which the aircraft should be flying, means for effecting a 90° phase shift between the signals, means for multiplying the phase shifted signals to produce an error signal, means for resolving the error signal into lateral and longitudinal vector voltages, means forming an external loop and operated by said vector voltages for returning the aircraft to course and for reducing said error signal to zero, and means forming an internal loop and operated by said vector voltages for reducing said error signal to zero.

4. A guidance system for aircraft and the like including means for producing a live video signal of the terrain over which the aircraft is flying, means for producing a stored video signal of the terrain over which the aircraft should be flying, means for effecting a 90° phase shift between the signals, means for multiplying the phase shifted signals to produce an error signal, means for resolving the error signal into lateral and longitudinal vector voltages, and means operated by said vector voltages for returning the aircraft to course and for reducing said error signal to zero.

5. A guidance system for aircraft and the like including means for producing a live video signal of the terrain over which the aircraft is flying, means for producing a stored video signal of the terrain over which the aircraft should be flying, means for effecting a 90° phase shift between the signals, means for multiplying the phase shifted signals to produce an error signal, means for modulating the error signal, means for resolving the error signal into lateral and longitudinal vector voltages, means for demodulating the vector voltages, means for integrating each voltage, and means operated by said integrated vector voltages for returning the aircraft to course and for reducing said error signal to zero.

6. A guidance system for aircraft including a radar antenna, means for moving the antenna with a scanning motion, a radar for transmitting time-separated pulses from the antenna, and for receiving back radar reflections from targets struck, a cathode ray tube operated as a flying spot scanner in angular and range synchronism with the radar, radar map means scanned by the cathode ray tube, photocell means for picking up as a signal the flying spot passing through the radar map, means to effect a relative 90° phase shift between the signal and the radar reflections, means for multiplying the phase shifted signal and reflections to provide an error voltage, means synchronized with the antenna moving means for resolving the voltage into lateral and longitudinal error voltages, an autopilot, means for supplying the lateral error voltage to the autopilot to change the course of the aircraft in azimuth, means to supply the longitudinal error voltage to the radar map means to change its position, and internal loop means connecting the lateral and longitudinal error voltages to deflect the spot of the cathode ray tube in lateral and longitudinal directions.

7. A guidance system for aircraft including a radar antenna, means for moving the antenna with a scanning motion, a radar for transmitting time-separated pulses from the antenna, and for receiving back radar reflections from targets struck, a cathode ray tube operated as a flying spot scanner in angular and range synchronism with the radar, radar map means scanned by the cathode ray tube, photocell means for picking up as a signal the flying spot passing through the radar map, means to effect a relative 90° phase shift between the signal and the radar reflections, means for multiplying the phase shifted signal and reflections to provide an error voltage, means synchronized with the antenna moving means for resolving the voltage into lateral and longitudinal error voltages, an autopilot, means for supplying the lateral error voltage to the autopilot to change the course of the aircraft in azimuth, and means to supply the longitudinal error voltage to the radar map means to change its position.

References Cited
UNITED STATES PATENTS 2,964,643 12/1960 Hobrough _____ 343—5
3,071,765  1/1963 Schutz _____ 343—5

RADNEY D. BENNETT, *Primary Examiner.*

T. H. TUBBESING, *Assistant Examiner.*

U.S. Cl. X.R.

340—3